United States Patent [19]

Arneson

[11] 4,112,460
[45] Sep. 5, 1978

[54] SIMPLIFIED BIAS AND GAIN ADJUST SYSTEM FOR COLOR CATHODE RAY TUBE

[75] Inventor: Blayne E. Arneson, Evergreen Park, Ill.

[73] Assignee: Admiral Corporation, Schaumburg, Ill.

[21] Appl. No.: 792,610

[22] Filed: May 2, 1977

[51] Int. Cl.² .................. H04N 9/52; H04N 9/537
[52] U.S. Cl. ........................... 358/29; 358/30; 358/40
[58] Field of Search ............... 358/27, 29, 30, 40, 358/10; 330/40

[56] References Cited

U.S. PATENT DOCUMENTS

| 3,586,766 | 6/1971 | Heuer et al. ............... 358/30 |
| 3,955,212 | 5/1976 | Engel et al. ............... 358/29 |

Primary Examiner—Robert L. Richardson
Attorney, Agent, or Firm—R. Lewis Gable; Albert G. Marriott

[57] ABSTRACT

There is disclosed a simplified bias and gain adjust system for a color cathode ray tube wherein, by a minimum of adjustments, the bias for an in-line color cathode ray tube may be adjusted to achieve color balance between the CRT's three electron guns and to achieve a maximum voltage difference between the CRT's $G_2$ electrode and the cathode element of the dominant electron gun of the color CRT. In particular, the system includes a chrominance matrix amplifier including an amplifying element in the form of a transistor for each of the color-difference signals provided by the chrominance demodulator(s) of the color television system; the color-difference signal is applied, illustratively, to the base of each such transistor, and a luminance signal Y is applied to the emitter of each such transistor element. In particular, first and second supply voltages are applied, respectively, through a first fixed resistor and a second variable resistor to each transistor's collector the second voltage source being less than the first-mentioned voltage source. By varying the second-mentioned resistor element, the load and therefore the gain of the transistor, as well as the effective supply voltage developed at the transistor's collector, are established. In an embodiment wherein such an amplifying circuit is adapted for a three-gun cathode ray tube, a common, second variable resistor is interconnected between the collectors of at least two of the driver transistors and is adjusted to differentially control the gain and the supply voltages of the two driver transistors.

17 Claims, 5 Drawing Figures

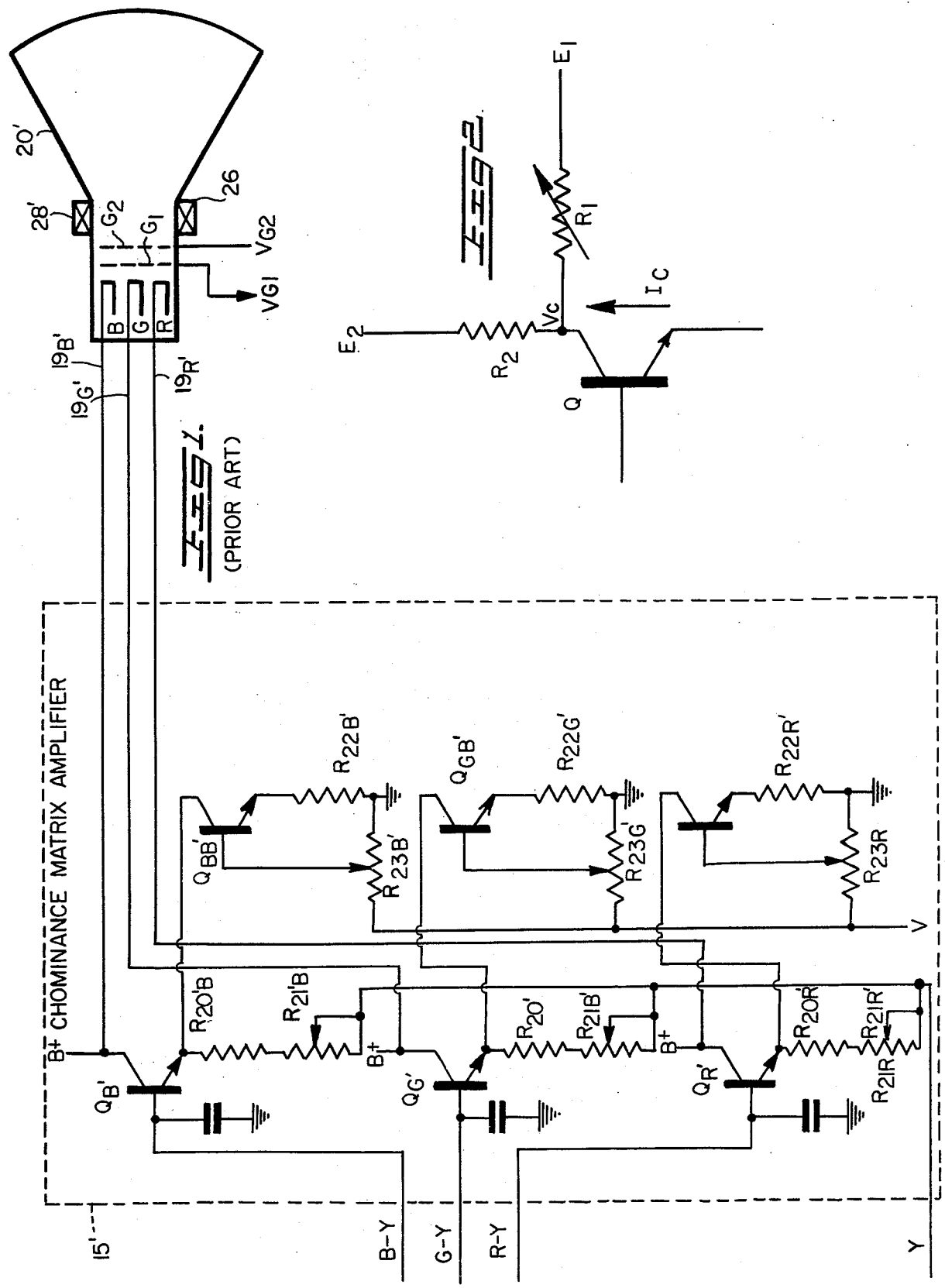

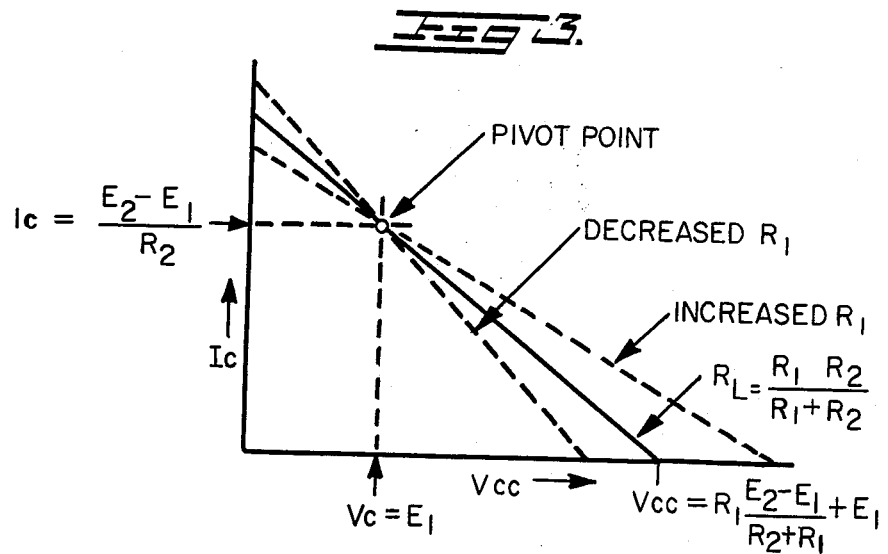
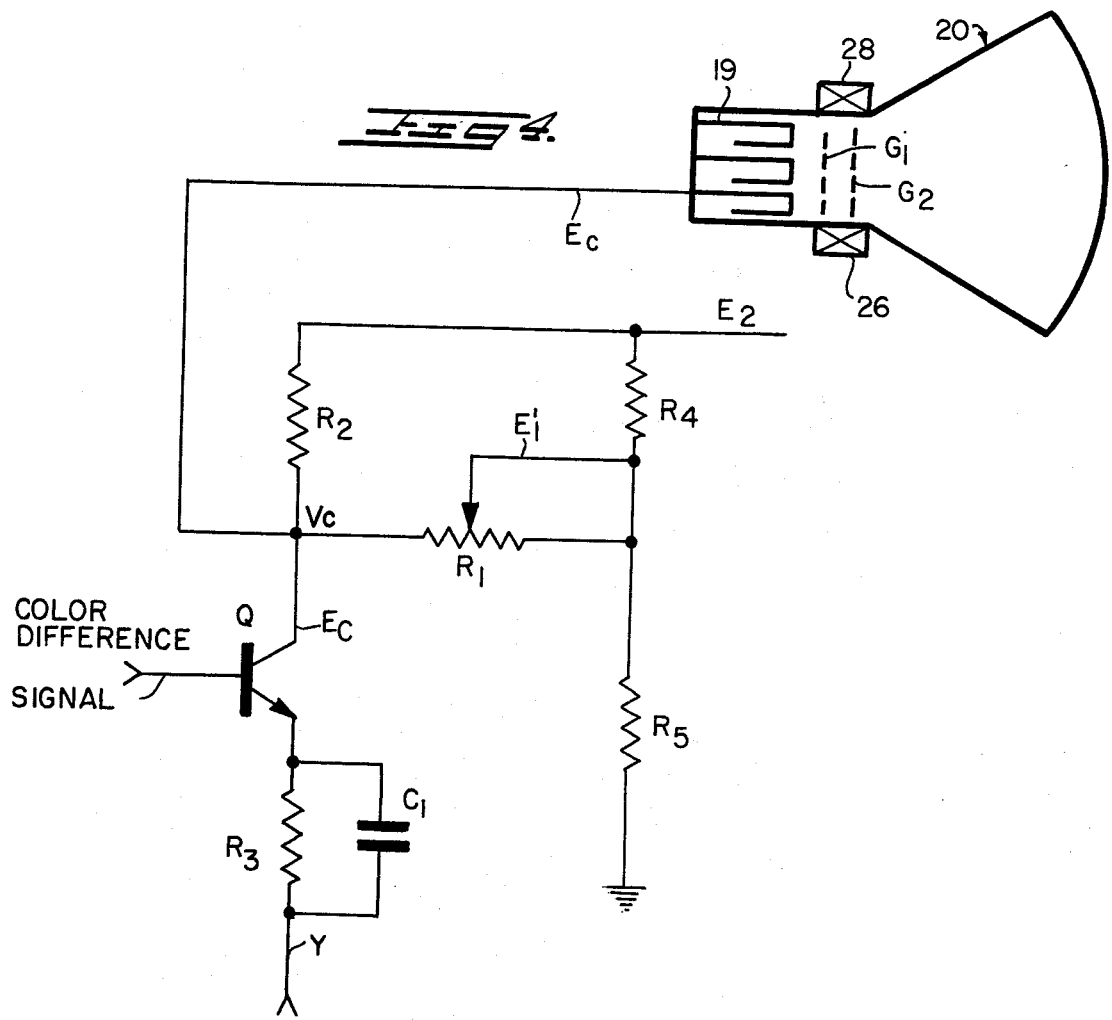

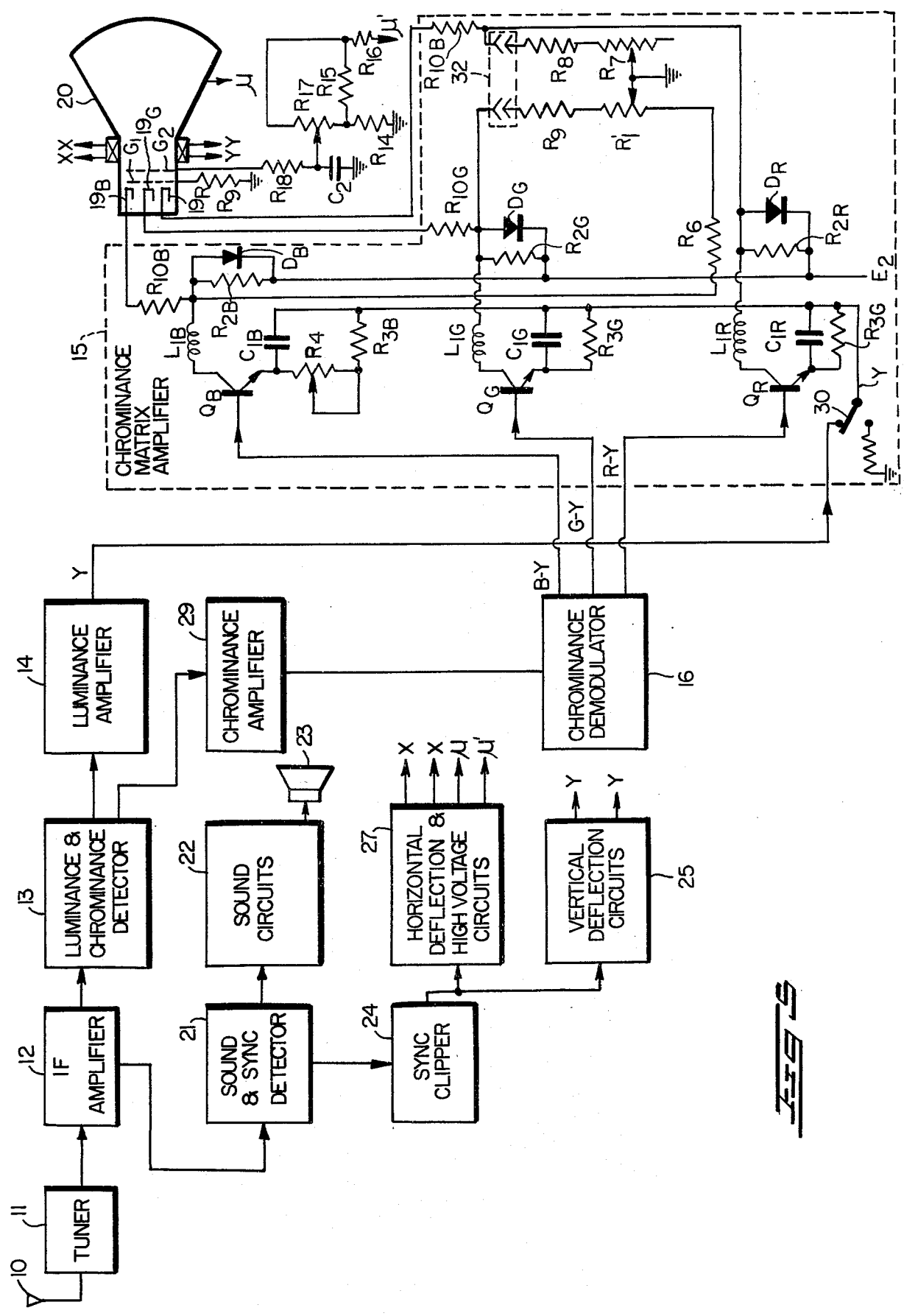

SIMPLIFIED BIAS AND GAIN ADJUST SYSTEM FOR COLOR CATHODE RAY TUBE

BACKGROUND OF THE INVENTION

1. Field of the Invention

This invention relates to color television

This invention relates to color television receivers, and more particularly to apparatus for controlling the operation of a color cathode ray tube (CRT) therein.

2. Description of the Prior Art

In color television receivers of the type employing a multi-gun color CRT, such as the well-known three-gun, shadow mask color CRT, a plurality of operating controls for the CRT ae conventionally provided. A number of these controls have no direct counterparts in the typical black and white television receiver, employing the usual single-gun black and white CRT; the additional controls are, of course, necessitated by the additional complexity of a multi-gun, multi-phosphor reproducer as compared with a single-gun, single-phosphor CRT.

To provide optimum operation of the color CRT, the controls associated with the color CRT are adjusted in accordance with a procedure, conventionally referred to as a color CRT set-up procedure, in order to correct for a number of variations inherently resulting from the multi-gun, multi-phosphor character of the reproducer. Such variations include differences in the cutoff potentials of the respective guns, differences in the cathode emission of the respective guns, and differences in the efficiencies of the respective phosphors. A goal of the set-up procedure may be viewed as obtaining the brightest picture possible, while maintaining proper "tracking" at all brightness levels. That is, it is desired that the color CRT reproduce white information with the proper color temperature at all brightness levels between maximum white and minimum white, with the color CRT being capable of reproducing information which represents the maximum white level at the highest achievable level of brightness. The set-up procedure associated with a receiver having operating controls as enumerated above requires a succession of interrelated adjustments of the brightness control and the various background and screen controls. The procedure is somewhat tedious, the interplay between the various controls requiring considerable ingenuity and patience to arrive at the precisely proper conditions. Adjustments of the background controls often require retouching of the screen controls, and vice versa.

A color television receiver representative of the prior art typically includes the following operating adjustments in association with the color CRT: means for adjusting the three separate guns to a current level near cutoff to establish a low brightness white color balance, and drive controls to achieve color balance at high brightness levels. The low level adjustment may be accomplished either by adjustment of the screen grid voltages of at least two of the three electron guns with a fixed bias between the cathodes and control grids, or by adjustment of the control grid to cathode bias of at least two electron guns while maintaining a fixed voltage on all three screen grids. The drive controls adjust the video gain to achieve black and white tracking in high brightness areas of the picture under dynamic conditions. The low level, sometimes referred to as "background adjustments", are usually performed with no video signal present and with the vertical deflection disabled to obtain a single horizontal line. The drive adjustments are then performed with normal video and deflection, but with the color disabled or turned off.

To achieve proper tracking normally requires at least four controls, two for the low level adjustment and two for drive control. Six controls frequently are used to achieve the best overall performance, i.e., maximum drive capability wtih optimum focus for all three electron guns.

In certain types of tubes employing the in-line slot mask, e.g. RCA 19VEJP22, all three screen grids are connected together internally and only one screen grid voltage adjustment is possible. In television receivers employing this type of tube, at least five controls are typically employed, consisting of at least two for background adjustment, two for drive adjustment and one for screen control. Up to seven controls may be used.

In accordance with present United States standards governing color television transmissions, luminance information, representing elemental brightness variations in a televised image, is transmitted on an amplitude-modulated main carrier component and chrominance information, representing color hue and saturation variations, is transmitted on a phase- and amplitude-modulated 3.58 MHz subcarrier constituent. Demodulation of the luminance component is generally accomplished by means of a conventional AM video detector, and results in composite video-frequency luminance signal having a bandwidth of approximately 4 MHz. Demodulation of the chrominance component requires in addition a synchronous detector, and results in three color-difference signals, commonly designated R-Y, G-Y and B-Y, which represent the difference between the respective primary colors and the transmitted luminance signal.

To control the tri-gun, tri-color shadow-mask-type CRT in almost universal use today, it is necessary to combine, or matrix, the three color-difference signals with the luminance signal to form color-control signals of the form R, G and B. While this may be done internally within the image reproducer by applying the signals at a sufficient amplitude directly to respective control elements of the tube, it is more efficient to instead matrix the color-difference singals with the luminance or Y-signal at a lower level externally to the color CRT and then amplify the resulting R, G and B signals to a level suitable for application to the color CRT.

An amplifier stage appropriate for this purpose, which may comprise a trio of individual amplifiers, one for each primary color, must necessarily meet certain functional requirements. For one, such a luminance-chrominance matrix amplifier stage must provide direct-current coupling between the luminance and color-difference signal sources and the color CRT to insure faithful reproduction. It must establish a reference voltage to which the color CRT can be set up or adjusted for cut-off, and must allow for individual adjustment of the amplitudes of the color-control signals applied to each gun to compensate for varying gun efficiencies without affecting either the reference voltage or the direct-current coupling. Furthermore, this stage may include suitable peaking circuitry for equalizing the higher-frequency video components with respect to the lower-frequency chrominance components of the composite video signal.

Referring now to FIG. 1, there is shown a prior art arrangement of a chrominance matrix amplifier, wherein the luminance signal as derived from a television luminance detector and luminance amplifier (not shown in FIG. 1), is added discretely by a separate amplifying element, typically a transistor, with each of the color-difference signals as derived from a chrominance demodulator (not shown in FIG. 1). The illustrated chrominance matrix amplifier 15' includes three distinct amplifying elements in the form of transistors $Q_B'$, $Q_G'$ and $Q_R'$ for separately amplifying the color-difference signals B-Y, G-Y and R-Y, respectively. As illustrated, the suffixes B, G and R are used throughout this description to indicate elements related, respectively, with the processing or display of the blue, green and red color signals upon a cathode ray tube (CRT) 20'. In particular, the luminance signal is applied via an adjustable resistor $R_{21B}'$ and resistor $R_{20B}'$ to the emitter of transistor $Q_B'$. In a similar fashion, the luminance signal is applied through variable resistors $R_{21}'$ and resistors $R_{20}'$ to the emitters of each of transistors $Q_G'$ and $Q_R'$. Effectively, the gain of each of the aforementioned transistors Q' is controlled by the adjustment of its connected resistor $R_{21}'$. In turn, the output from each of the aforementioned transistors Q' is derived from its collector and is applied to a corresponding cathode element 19' of the color CRT 20'. For example, the collector of transistor $Q_B'$ is connected to the cathode element $19_B'$ of the blue electron gun.

In FIG. 1, the color CRT 20' is an in-line color CRT wherein the $G_1$ elements associated with each of the three electron guns are internally connected and, in similar fashion, the $G_2$ elements of the three color electron guns are internally connected. The $G_1$ and $G_2$ electrodes serve to accelerate and to focus the three electron beams onto a phosphorescent screen of the CRT 20'. Because of the common connection of each of the $G_2$ electrodes, it is impossible to establish individual gun cutoff bias by separate control. Instead, it is necessary to adjust the bias as applied to each of the individual cathode elements $19_B'$, $19_G'$ and $19_R'$. As indicated above, one of the electron guns will require a greater bias than the remaining two electron guns; this one electron gun requiring greater bias is referred to as the dominant electron gun.

In a typical set-up procedure of the television set including the chrominance matrix amplifier 15' of FIG. 1, the resistors $R_{21}'$ are set to minimum. This provides maximum gain for each stage. The amplitudes of the color-difference signals are reduced to zero by means of the color control, e.g. a variable potentiometer within the chroma demodulator or the color matrixing circuit, and the luminance signal is removed by opening the common emitter drive line connected to the Y input. This may be accomplished by means of a switch connected in-series with this line or a removable plug-in jumper connector. The emitter currents of the transistors $Q_B'$, $Q_G'$ and $Q_R'$ are now established by the transistors $Q_{BB}'$, $Q_{GB}'$ and $Q_{RB}'$ which are connected as constant current sources in which the collector currents are established by the positive bias voltage applied to their respective bases as determined by the voltage source V and the setting of the respective potentiometers $R_{23}'$. The three potentiometers $R_{23}'$ then are set to minimum (in this case, zero). The collector voltages of all three amplifier transistors $Q_B'$, $Q_G'$ and $Q_R'$ now are maximum, providing maximum bias on the three CRT cathodes 19'. Next, the voltage applied to the commonly-connected $G_2$ element then is increased until a color appears upon the display screen of the CRT 20'. The particular color displayed thereon identifies the dominant electron gun of the CRT 25. Next, the potentiometers $R_{23}'$ of the remaining two electron guns are increased to obtain the desired low-brightness, gray-scale balance, i.e., the aforementioned potentiometers $R_{23}'$ are adjusted until a gray or low-brightness white raster (or line, if the vertical deflection has been removed) appears upon the display screen of the CRT 20'. Next, the voltage $V_{G2}$ as applied to the commonly-connected $G_2$ elements, is decreased so that the image is extinguished. In establishing the proper bias for the cathode elements 19', it is desired to maintain the maximum voltage difference between that applied to the cathode elements 19' and that applied to the commonly-connected $G_2$ elements to maintain the best-possible focus of the electron beams onto the faceplate of the CRT 20'.

To establish the gain or drive of each of the driver transistors Q', there is included in the emitter circuit of each such driver transistor Q' the variable resistor $R_{21}'$ and fixed resistor $R_{20}'$. In particular, the luminance signal is applied via the variable resistor $R_{21B}'$ and the fixed resistor $R_{20B}'$ to the emitter of the blue driver transistor $Q_B'$. By adjusting the impedance of the variable resistor $R_{21B}'$, the gain of the blue driver transistor $Q_B'$ is controlled correspondingly. After adjusting the bias currents as described, by means of potentiometers $R_{23}'$, the luminance signal is reconnected and the brightness and contrast controls are set for a normal picture. The picture typically will assume some color tint. The gains or drives of two stages are reduced as required, by increasing their respective resistors $R_{21}'$, until a satisfactory black and white picture is obtained. Color is then increased to normal level. Thus, three separate adjustments were required to set the gain of the corresponding driver transistors Q'. In addition, three further adjustments were necessary to set the bias of the driver transistors, i.e., setting the resistors $R_{23}'$ associated with the bias transistors. Noting the interrelationship between the setting of the cathode bias and the setting of the gains of the driver transistors, the setting-up of a color television including such a chrominance matrix amplifier becomes quite complex and tedious, requiring many readjustments.

Further, the prior art has attempted to reduce the complexity of the adjustments of cathode bias and driver amplifier gain within color television receivers, an example of which is U.S. Pat. No. 3,737,562, wherein a driver transistor amplifies one of the blue, green or red signals before applying it to the cathode element of a CRT. In particular, a variable resistor is connected in its emitter circuit with a constant reference potential source, such as a zener diode, the combination of the series-connected zener diode and variable resistor being bypassed by a further resistor. The noted patent suggests that at the point when current is established through the aforementioned resistors so that the potential at the point of interconnection of the bypassing resistor and the variable resistor equals the voltage established at the point of interconnection between the zener diode and the variable resistor, the potential as applied to the $G_2$ electrode of the color CRT is adjusted to establish the black level of that electron gun. In the above-noted patent, it is contemplated that there are separate controls for establishing the bias applied to each of the distinct $G_2$ electrodes, as opposed to an in-line color CRT wherein the $G_2$ electrodes are interconnected with each other. The noted variable potentiometer controls the gain of its amplifying transistor and it is further suggested that such a variable resistor be interconnected in the emitter circuits of two amplifying transistors in the form of a chrominance matrix control whereby the gain of each such transistor may be controlled by a single element. The circuitry suggested in the above-noted patent is more expensive than that contemplated by the subject invention in that the matrixing of the color-difference signal and the luminance signal are accomplished in a separate stage and further, the color cathode ray tube is of a more expensive design in which distinct voltage adjustments are made to each of the CRT's guns to adjust its black level.

SUMMARY OF THE INVENTION

It is therefore an object of this invention to simplify the adjustments that are necessary to establish the bias potential for the cathodes of an in-line color CRT.

It is a still further object of this invention to provide a chrominance matrix amplifier of relatively simple, inexpensive design, wherein the color-difference and luminance signals are summed for each of the color signals and wherein the gain and the bias of each color amplifier transistor is set with but a single potentiometer.

It is a still more specific object of this invention to provide a color matrix amplifier for an in-line color CRT, wherein the gain of each of the corresponding color driver transistors, as well as the bias potential applied to the cathode elements of such color CRT, is controlled by a significantly-reduced number of elements.

In accordance with these and other objects of this invention, there is provided a new and improved transistor amplifier circuit comprising a driver transistor having a first collector circuit in which a first potential source is applied via a first variable impedance element to the collector of the driver transistor, and a second collector circuit having a second potential source greater than the first source applied across a second impedance to the collector of the driver transistor. The first variable impedance is adjusted to control the gain of the amplifier circuit, as well as the potential appearing at the collector of the driver transistor.

In a further aspect of this invention, the above-described transistor amplifier circuit is adapted as a chrominance matrix amplifier circuit for a color CRT, wherein each cathode is driven by such a driver transistor. In particular, for a three-electron gun color CRT, a driver transistor is utilized for each of such electron guns, with the color difference signal being discretely applied to the base of its driver transistor and the luminance signal being applied in-common to the emitter of each of the three driver transistors. In the collector circuit of each transistor, a second potential is applied across a second impedance element and a first potential is applied across a first, variable impedance element to the collector.

The effective load resistance for the amplifying stage is the parallel combination of the first and second impedance elements, and the open circuit collector voltage (zero current) of the driver transistor, is the voltage appearing at the point of interconnection between the first and second impedance elements. In this manner, the first variable impedance element may be adjusted to set the collector voltage and therefore the bias to the cathode element of its electron gun and at the same time, to control the drive or gain of its driver transistor. In this manner, the biases and therefore the black levels of each of the electron guns of the color CRT may be readily adjusted in a simplified fashion.

Further to this end, the variable impedance element of two driver amplifier transistors may be interconnected between their collectors and set to differentially control the gain and collector bias of each of the two transistors, thereby simplifying the overall color controls of the television receiver.

In a more detailed aspect of this invention, wherein the invention is incorporated into a color television receiver having a color CRT with a plurality of electron guns, one of the electron guns is considered to be the dominant or most sensitive gun and one electron gun is considered to be the least sensitive electron gun. In particular, the first variable impedance element has minimum $R_{1(min)}$ and maximum $R_{1(max)}$ values, in relationship to the fixed value $R_2$ of the second impedance element and the cutoff potential $E_{c(max)}$ required for the dominant or most sensitive electron gun and the cutoff potential for the least sensitive gun $e_{c(min)}$, in accordance with the following formula:

$$\frac{R_{1\,(max)}}{R_{1\,(min)}} \cdot \frac{R_{1\,(min)} + R_2}{R_{1\,(max)} + R_2} = \frac{E_{c\,(max)}}{E_{c\,(min)}}$$

BRIEF DESCRIPTION OF THE DRAWINGS

These and other objects and advantages of the present invention will become more apparent by referring to the following detailed description and accompanying drawings, in which:

FIG. 1 is a schematic diagram of the circuitry of a prior art chrominance matrix amplifier for a color television receiver;

FIG. 2 is a simplified showing of the circuit elements comprising the amplifier circuit of this invention;

FIG. 3 is a graph of the load line characteristics of the amplifier shown in FIG. 2, taken as a function of its open circuit collector voltage and its collector current;

FIG. 4 is a more complete schematic diagram of the amplifier circuit of this invention; and FIG. 5 is a schematic diagram of a television receiver incorporating a chrominance matrix amplifier of this invention for adding the color-difference and luminance signals, as well as setting in a simplified fashion the cathode bias and gain of each of the driver amplifiers.

DETAILED DESCRIPTION OF THE PREFERRED EMBODIMENTS

Referring now to the drawings and in particular to FIG. 2, there is shown an amplifier circuit in accordance with the principles of the invention. The input signal to be amplified is applied to the base of the transistor Q to develop an output voltage at its collector. A second collector circuit includes a second potential $E_2$ that is applied via a fixed resistor $R_2$, and a first potential source $E_1$ having a voltage level lower than that of the source $E_2$, is applied via a variable resistor $R_1$ to the collector of the transistor Q. As the notation on FIG. 2 indicates, a current $I_c$ flows through the collector of transistor Q. With respect to the amplifier transistor as shown in FIG. 2, the following operating conditions are derived. First, the effective open circuit collector supply voltage $V_{cc}$ is given by the following equation:

$$V_{cc} = \left(\frac{E_2 - E_1}{R_1 + R_2}\right)R_1 + E_1 \quad (1)$$

$$= \frac{E_2 R_1}{R_1 + R_2} + E_1\left(1 - \frac{R_1}{R_1 + R_2}\right),$$

where $R_1$, $R_2$, $E_2$ and $E_1$ are identified in FIG. 2. The effective collector load resistance $R_L$ is given by the following equation:

$$R_L = \frac{R_1 R_2}{R_1 + R_2} \quad (2)$$

For any collector current $I_c$, the collector voltage $V_c$ becomes:

$$V_c = V_{cc} - I_c R_L \quad (3)$$

$$= \frac{E_2 R_1}{R_1 + R_2} + E_1\left(1 - \frac{R_1}{R_1 + R_2}\right) - I_c\left(\frac{R_1 R_2}{R_1 + R_2}\right)$$

The circuit configuration of FIG. 2 is based upon a design concept in which the load line, as shown in FIG. 3, for an amplifier stage may be caused to pivot about a selected operating point. As shown in FIG. 2, the voltage levels of the two supply sources are such that $E_2 > E_1$. If the collector current $I_c$ is such that $E_2 - I_c R_2 = E_1$, it is seen that there will be no current through the variable resistance $R_1$. Since there is no current through the variable resistance $R_1$ at this point, it has no effect in the circuit. However, the effective AC load resistance is the parallel combination of the variable resistance $R_1$ and the fixed resistance $R_2$, and the open circuit collector voltage is given by equation (1). Thus, the effective collector voltage $V_c$ and the load resistance $R_L$ may be adjusted by varying the variable resistance $R_1$ without altering the pivot point, as illustrated in FIG. 3.

When $V_c = E_1$, there is no current through the variable resistance $R_1$, and equation (3) may be expressed as:

$$E_1 = \frac{E_2 R_1}{R_1 + R_2} + \quad (4)$$

$$E_1\left(1 - \frac{R_1}{R_1 + R_2}\right) - I_c\left(\frac{R_1 R_2}{R_1 + R_2}\right)$$

By appropriate manipulation of equation (4), it is seen that:

$$I_c\left(\frac{R_1 R_2}{R_1 + R_2}\right) = \frac{E_2 R_1}{R_1 + R_2} + E_1 - \frac{E_1 R_1}{R_1 + R_2} - E_1 \quad (5)$$

Simplifying equation (5) provides:

$$I_c R_2 = E_2 - E_1, \text{ and} \quad (6)$$
$$I_c = \frac{E_2 - E_1}{R_2}$$

Thus, for this value of collector current $I_c$, as given by equation (6) and where voltage $V_c = E_1$, there is no current $I_c$ flowing through variable resistance $R_1$ and all possible load lines $R_L$ must pass through the pivot point as shown in FIG. 3. From observation of equations (1) to (6) and FIG. 3, it is evident that considerable control may be obtained over both load resistance $R_L$ (which determines the gain of the transistor Q) and zero current collector voltage $V_{cc}$ by adjusting the value of the variable resistance $R_1$.

Referring not to FIG. 4, it is evident that the illustrated circuit is a modification of the circuit shown in FIG. 3, and is adapted to drive an electron gun and in particular, a cathode element 19 of a color CRT 20. As will become apparent, a single control element, i.e., variable resistance $R_1$, is adjusted to set both the bias voltage as applied to the cathode element 19 of the electron gun of the color CRT 20, as well as to adjust the drive or gain of the transistor Q. As indicated in FIG. 4, this circuit may be incorporated as a video drive stage or more particularly as a chrominance matrix amplifier within a color television receiver. In particular, a color-difference signal is applied to the base of transistor Q, while the luminance signal Y is applied via parallel coupled resistor $R_2$ and capacitor $C_1$ to the emitter of transistor Q which effects the summation of these signals to provide an output therefrom upon its collector. The collector of transistor Q is coupled to the cathode 19 of one of the electron guns of the color CRT 20. As explained above with respect to FIG. 2, the variable resistance $R_1$ may be adjusted whereby the gain of transistor Q may be set as well as the level of the DC potential appearing at its collector. In the context of a chrominance matrix amplifier as shown in FIG. 4, it is evident that the variation of variable resistor $R_1$ will set the gain of the driver amplifier Q as well as the DC voltage applied to the cathode 19, and it is significant that these variations are accomplished by a single control element, i.e., resistor $R_1$. This is a particular advantage wherein the color CRT 20 is of the in-line type, wherein the separate elements of the $G_2$ electrode are connected in common. Further with respect to FIG. 4, it is noted that the separate voltage source $E_1$ (shown in FIG. 2) has been eliminated and that a voltage divider comprised of resistors $R_4$ and $R_5$ is connected to source $E_2$ to apply a voltage $E_1$ across the variable resistance $R_1$ to the collector of transistor Q.

In an illustrative embodiment of this invention wherein the color CRT takes the form of that CRT manufactured by RCA under their designation 19VEJP22, e.g. wherein the maximum cutoff ratio between the minimum and maximum bias voltage $E_c$ applied to the cathode element 19 of the CRT 20, the values of the various elements of the circuit shown in FIG. 4 may be calculated as follows. First, the CRT bias $E_c$ is given by the following equation:

$$E_c = V_{cc} - E_1 \quad (7)$$

By inserting equation (7) into equation (1), it is seen that $$E_c = \left(\frac{E_2 - E_1}{R_1 + R_2}\right)R_1 + E_1 - E_1, \quad (8)$$

which may be simplified as:

$$E_c = (E_2 - E_1)\frac{R_1}{R_1 + R_2} \quad (9)$$

For the illustrative example of the CRT 20 with a maximum cutoff ratio of 1.5 for any pair of electron guns and with fixed values of $E_1$, $E_2$ and $R_2$, the minimum and maximum values of the bias voltage may be expressed as:

$$E_{c\,(max)} = (E_2 - E_1)\frac{R_{1\,(max)}}{R_{1\,(max)} + R_2} \quad (10)$$

and $$E_{c\,(min)} = (E_2 - E_1)\frac{R_{1\,(min)}}{R_{1\,(min)} + R_2} \quad (11)$$

The ratio of equations (10) and (11) provides:

$$\frac{E_{c\,(max)}}{E_{c\,(min)}} = \frac{R_{1\,(max)}}{R_{1\,(max)} + R_2} \cdot \frac{R_{1\,(min)} + R_2}{R_{1\,(min)}} = 1.5 \quad (12)$$

Another factor to be considered is the maximum effective collector load resistance $R_L$, since this determines the upper frequency limit for the amplifier. Assuming a collector circuit corner frequency of 1 MHz for 20 pF shunt capacitance yields a maximum value of 8K for the load resistance $R_L$. A corner frequency of 1 MHz is acceptable if corresponding peaking may be achieved in the emitter drive circuit. From equation (2) for a load resistance $R_L = 8K$, it is seen that:

$$\frac{R_{1\,(max)}R_2}{R_{1\,(max)} + R_2} = 8K\Omega \quad (13)$$

Equation (13) establishes one relationship between $R_{1(max)}$ and $R_2$. A second relationship may be established in terms of typical maximum bias requirements. A compromise set of conditions between transistor drive requirements and reasonable supply voltages may be obtained by assuming a cutoff bias of 175V for the electron guns of the color CRT 20 and letting ($E_2 - E_1$) equal 200V. From equation (9) for the above value, it is seen that:

$$175 = 200 \frac{R_{1\,(max)}}{R_{1\,(max)} + R_2} \quad (14)$$
$$175\,R_{1\,(max)} + 175\,R_2 = 200\,R_{1\,(max)}$$
or $7\,R_2 = R_{1\,(max)}$ Substituting equation (13) into equation (14), there is provided:

$$\frac{(7R_2)(R_2)}{7R_2 + R_2} = 8$$
$$\frac{7R_2}{8} = 8$$
$$R_2 = \frac{64}{7} K\Omega \approx 9.1\,K$$
and $R_{1\,(max)} = 64\,K\Omega$ These values may now be substituted into equation (12), as follows:

$$\frac{64}{64 + \frac{64}{7}} \cdot \frac{R_{1\,(min)} + \frac{64}{7}}{R_{1\,(min)}} = 1.5$$

yielding $R_{1\,(min)} = \frac{64}{5} K\Omega \approx 13\,K$

Thus, the minimum bias resistance $R_{1(min)}$ may be chosen to be of 13 K$\Omega$, and the variable resistance $R_1$ to have a maximum value of 50 K$\Omega$. With the resistance $R_1$ set at maximum, $V_{cc}$ is 174.76V above $E_1$. With the variable resistance $R_1$ set to its minimum value, $V_{cc}$ is 117.65V above $E_1$. The ratio of $V_{cc(max)}$ to $V_{cc(min)}$ is 1.49/1. The maximum effective value for $R_L$ is 7.95 K, and the minimum is 5.35 K. The ratio is again 1.49/1. Thus, the achievable bias ratio and the resistance (gain or drive) ratio are identical. For an electron gun requiring a higher cutoff bias, the drive signal is increased in direct proportion to the bias requirement. Further, suitable emitter drive peaking for the circuit may be achieved by applying the luminance signal Y through the emitters via resistor $R_3$ of 330$\Omega$ shunted by a 470 pF capacitor $C_1$. This provides a corner frequency in the emitter circuit of transistor Q of 1.025 MHz.

In the embodiment as shown in FIG. 4 wherein the separate source $E_1$ is replaced by the voltage divider comprised of resistors $R_4$ and $R_5$, the optimum resistance of the source $E_1$ is such that the voltage divider provides the desired value for $R_{1(min)}$, as derived above as being in the order of 13 K$\Omega$. Wherein the voltage $E_1$ is set to be illustratively 35V and the level of source $E_2$ is set to be 235V, $R_5$ may be set to be illustratively 15 K$\Omega$ and $R_4$ may be set to be 19 K, to provide a source resistance of 12.88 K and to develop 33.25V at the tap of variable resistance $R_1$.

Referring now to FIG. 5, there is shown in schematic diagram form, a complete television receiver incorporating the chrominance matrix amplifier 15 of this invention, for approximately biasing and driving the cathode elements $19_B$, $19_G$ and $19_R$ of the electron guns of the in-line color CRT 20. In particular, a received signal is intercepted by an antenna 10 and coupled in a conventional manner to a tuner 11, which includes the usual radiofrequency amplifying and heterodyning stages for translating the signal to an intermediate frequency. After amplification by an intermediate-frequency amplifier 12, the signal is applied to a luminance and chrominance detector 13 wherein luminance and chrominance information in the form of a composite video-frequency signal is derived. The luminance component of this signal is amplified in a luminance amplifier 14 and applied as the luminance signal Y to a luminance-chrominance matrix amplifier stage 15, wherein it is combined with red, green and blue color-difference signals (R-Y, G-Y and B-Y) independently derived by the receiver chrominance demodulator 16 to form suitable drive signals for the red, green and blue cathodes $19_R$, $19_G$ and $19_B$, respectively, of the receiver image reproducer 20. Matrix amplifier stage 15 will be described in detail later.

The output signal from intermediate-frequency amplifier 12 is also applied to a sound and sync detector 21, wherein a second composite video-frequency signal is derived which includes both sound and synchronizing components. The sound component is applied to sound circuits 22, wherein conventional sound demodulation and amplification circuitry develops an audio output signal suitable for driving a speaker 23. The synchronizing component, in the form of vertical and horizontal sync pulses, is separated from the composite signal by a sync clipper 24. A vertical deflection circuit 25 utilizes the separated vertical sync pulses to generate a synchronized vertical-rate sawtooth scanning signal in a vertical deflection winding 26. The horizontal sync pulses from sync clipper 24 are applied to horizontal deflection and high voltage circuits 27, which include conventional reaction-scanning-type circuitry for utilizing these pulses to generate a synchronized horizontal-rate sawtooth scanning current in a horizontal deflection winding 28, and high voltage DC accelerating potential $\mu$ for the ultor electrode of the CRT 20.

The chrominance signal from luminance and chrominance detector 13, which includes color subcarrier and synchronizing burst components, is applied to a bandpass amplifying stage, chrominance amplifier 29, wherein it is amplified to a level sufficient for application to chrominance demodulator 16. The chrominance demodulator 16 provides the color-difference signals (B-Y), (G-Y) and (R-Y), which are applied, as shown in FIG. 5, to the chrominance matrix amplifier 15 of this invention. In particular, the B-Y color-difference signal is applied to the base of the blue driver transistor $Q_B$ associated with the cathode element $19_B$ of the blue electron gun. Similarly, the color-difference signals G-Y and R-Y are applied to the bases of the green and red driver transistors $Q_G$ and $Q_R$, respectively associated with the green and red cathodes $19_B$ and $19_R$ of the green and red electron guns of the CRT 20. As is evident from FIG. 5, the subfixes B, G and R are used to designate those elements of the chrominance matrix amplifier 19 or of the color CRT 20 that are associated with the display or processing of the respective blue, green and red signals.

In particular, the collector of the blue driver transistor $Q_B$ is connected via an inductance $L_{1B}$ and protective resistor $R_{10B}$ to the cathode $19_B$ of the blue electron gun. The inductance $L_{1B}$ serves to peak the output of the blue driver transistor $Q_B$, extending its high frequency response. The protective resistor $R_{10B}$ serves as a protection against arcing that may occur within the color CRT 20 to impose a high current spike upon the coupled cathode $19_B$. The luminance signal Y as derived from the luminance amplifier 14 is applied via a set-up switch 30 and a circuit including fixed resistor element $R_{3B}$, series-connected with variable resistor $R_4$ and both connected in-parallel with capacitor $C_{1B}$, to the emitter of blue transistor $Q_B$. The variable resistor $R_4$ affects the gain of the blue driver transistor $Q_B$, whereby the temperature of the displayed image upon the color CRT 20 and in particular the quality of the white portions in terms of its bluish content, may be adjusted. The second voltage $E_2$ is applied via resistor $R_{2B}$ and the inductance $L_{1B}$ to the collector of the blue driver transistor $Q_B$. The resistor $R_{2B}$ is connected in-parallel with a diode $D_B$. The diode $D_B$ as well as the diodes $D_G$ and $D_R$ further protect their respective driver transistors against the appearance of a high surge of current that may occur upon arcing within the CRT 20, the aforementioned diodes being rendered conductive to shunt the high peak or surge of current about the driver transistor. In similar fashion, the luminance signal Y is connected to the emitter of green driver transistor $Q_G$ and the voltage $E_2$ is connected to the collector of green driver transistor $Q_G$.

In order to reduce the number of control elements for adjusting the voltage bias applied to the cathodes 19 of the color CRT 20, a single resistor $R_1'$ is interconnected between the collectors of the green driver transistor $Q_G$ and the blue driver transistor $Q_B$, and its adjustment will provide a blue/gree differential control. Resistor $R_6$ is inserted between one end of resistor $R_1'$ and the collector of blue driver transistor $Q_B$, while resistor $R_9$ is coupled between the other end of resistor $R_1'$ and the collector of the green driver transistor $Q_G$, so that the resistance presented thereto does not fall below the minimum value as determined above. The potential $E_2$ of the second source is applied via resistor $R_{2R}$ to the collector of the red driver transistor $Q_R$. The variable impedance $R_7$ is coupled via a minimum fixed resistance $R_8$ to the collector of the red driver transistor $Q_R$.

As indicated above, it is required that the voltage applied via the variable impedance $R_1$ to the collector of the transistor amplifier be less than that applied via the fixed resistive element thereto. In the illustrative embodiment shown in FIG. 5, the first voltage $E_1$ applied via the variable resistor, e.g. $R_1'$, is chosen to be zero, and the tap of the variable resistor $R_1'$ is connected to ground. In this regard, it is noted that the value of $E_1$ may be any value less than that of the source $E_2$, including zero or negative voltages. Further, a connector or switch 32 is illustratively shown in FIG. 5 for connecting resistor $R_9$ to the point of interconnection between the diode $D_G$ and resistor $R_G$, and resistor $R_G$, and resistor $R_8$ to the point of interconnection of the diode $D_R$ and the resistor $R_{10B}$.

In operation, each of the driver transistors $Q_B$, $Q_G$ and $Q_R$ sums its difference signal with the luminance signal Y and provides a drive signal via its protecting resistor $R_{10}$ through its corresponding cathode 19. The cathode ray tube 20 includes a first, accelerating electrode $G_1$, the elements of which are commonly connected via biasing resistor $R_9$ to ground, whereby a fixed potential is applied to the $G_1$ electrode. Further, the $G_2$ electrodes of the in-line color CRT 20 are connected together and a variably-set voltage is applied thereto, provided by the circuit as shown in FIG. 5. In particular, a relatively high voltage is derived from the horizontal deflection and high voltage circuits 27, as identified by the reference numeral $\mu'$ and is applied to a corresponding marked terminal of the variable voltage-setting circuit comprised of a resistor $R_{16}$ that is coupled in-series with a variable resistor $R_{17}$ and resistor $R_{14}$ to ground, with a fixed resistor $R_{15}$ coupled in-parallel with the variable resistor $R_{17}$. By adjusting the tap of variable resistor $R_{17}$, a variable voltage is applied via resistor $R_{18}$ to commonly-connected $G_2$ electrodes of the red, green and blue electron guns of the color CRT 20. The tap of the variable resistor $R_{17}$ is connected also by capacitor $C_2$ to ground.

As will now be evident, the set-up procedure for establishing an appropriate bias and drive for the color CRT 20 is a relatively simple process. First, switch 30 is set to the open position to remove the Y signal and color is turned off. Then, the tap of the variable resistor $R_{17}$ is set to its minimum position to apply a minimum voltage to the commonly-connected $G_2$ electrodes. Next, maximum voltages are derived from the variable resistors $R_1'$ and $R_7$; in particular, the maximum position of variable resistor $R_1'$ is obtained by setting it to its midpoint whereby a cyan (equal blue and equal green) color appears upon the faceplate of the CRT 20. Next, the variable resistor $R_7$ that controls the variable bias and gain of the red driver transistor $Q_R$ is set so that a white image appears upon the faceplate of the CRT 20. Next, the variable resistor $R_{17}$ is adjusted to decrease the voltage applied to the $G_2$ electrodes until a cutoff condition is derived (readjusting $R_1'$ and $R_7$ if necessary to maintain white balance as cutoff is approached). In the above description, it has been assumed that either the blue or green electron gun will be the dominant one, thus requiring a decrease of its gain to achieve a balance of the displayed colors. However, the red electron gun may be the dominant gun, and in that instant, an adjustment of the variable resistance connected between the green and blue driver transistors would leave the image appearing with an overall red quality. In such instances, it then becomes necessary to reverse the connection of the connector or switch 32 whereby resistor $R_9$ is connected to the point of interconnection between resistor $R_{10B}$ and diode $D_R$, and the resistor $R_8$ is connected to the point of interconnection between diode $D_G$ and resistor $D_{10G}$. In this manner, the variable resistor $R_1'$ then is interconnected between the collector of the blue driver transistor $Q_B$ and the collector of the red driver transistor $Q_R$, whereby appropriate adjustment of the dominant red electron gun may be made.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. In a transistor amplifier circuit, a transistor amplifier having a base element, a collector element and an emitter element, first and second potential sources, first and second impedance means for coupling, respectively, said first and second potential sources to said collector element, said first impedance means being variable whereby both the gain of said transistor amplifier and the DC voltage established at said collector element are controlled in proportion to the adjustment of said first impedance means.

2. The transistor amplifier circuit as claimed in claim 1, wherein the amplitude of said first potential source is less than that of said second potential source.

3. The transistor amplifier circuit as claimed in claim 1, wherein said first potential source comprises a voltage divider resistor coupled to said second source and having an intermediate point for applying a voltage of reduced amplitude to said first variable impedance means.

4. The transistor amplifier circuit as claimed in claim 1, wherein the open circuit collector voltage of said transistor amplifier is in accordance with the following expression:

$$\frac{R_1(E_2 - E_1)}{(R_2 + R_1)} + E_1,$$

wherein $R_1$ is the impedance of said first impedance means, $R_2$ is the impedance of said second variable impedance means, $E_2$ is the amplitude of said second potential source and $E_1$ is the amplitude of said first voltage source.

5. In a color television receiver comprising:
 a. a color CRT having first and second electron guns, each including a cathode element and an accelerating electrode;
 b. first and second transistor amplifiers for first and second color channels, respectively, each of said first and second amplifiers having a base, an emitter and a collector;
 c. first and second potential sources associated with each of said first and second transistor amplifiers;
 d. second impedance means for coupling said second sources to said collectors of said first and second transistor amplifiers; and
 e. first variable impedance means for coupling said first sources to said collectors of said first and second transistor amplifiers, said first variable impedance means being varied to control both the gain and the collector DC voltage of said first and second transistor amplifiers in proportion to the adjustment of said first variable impedance means.

6. The color television receiver as claimed in claim 5, wherein there is further included first and second means for respectively coupling the collectors of said first and second transistor amplifiers to said cathode elements of said first and second electron guns to establish discrete DC potentials thereon.

7. The color television receiver as claimed in claim 6, wherein there is further included means for establishing a variable potential to said accelerating electrodes of said first and second electron guns.

8. The color television receiver as claimed in claim 7, wherein said accelerating electrodes of said first and second electron guns are electrically coupled to each other, and the cutoff potentials of said first and second electron guns are established by varying the DC potential at said collectors of said first and second transistor amplifiers in accordance with the adjustment of said first variable impedance means.

9. The color television receiver as claimed in claim 5, wherein said first variable impedance means comprises a variable resistive element interconnected between said collector elements of said first and second transistor amplifiers, said variable resistive element having a single control element for differentially controlling both the DC voltage and gain of said first and second transistor amplifiers.

10. The color television receiver as claimed in claim 5, wherein said first potential source comprises a voltage divider circuit having one end thereof coupled to said second potential source and having intermediate points for applying potentials of reduced amplitude to said collector elements of said first and second transistor amplifiers.

11. The color television receiver as claimed in claim 5, wherein said first electron gun is the dominant electron gun having a cutoff potential $E_{c(max)}$ and the second electron gun is more sensitive than the first electron gun having a cutoff voltage $E_{c(min)}$ less than $E_{c(max)}$, said first impedance element being varied from a minimum value $R_{2(min)}$ to a maximum value $R_{2(max)}$, the first impedance element having an impedance value of $R_1$, and the relationship of the aforementioned elements being expressed by the following equation:

$$\frac{R_{1\,(max)}}{R_{1\,(min)}} \left( \frac{R_{1\,(min)} + R_2}{R_{1\,(max)} + R_2} \right) = \frac{E_{c\,(min)}}{E_{c\,(max)}}$$

12. The color television receiver as claimed in claim 11, wherein the difference between $E_2$ and $E_1$ is greater than the difference between the cutoff potential $E_{c(max)}$ and that potential corresponding to the maximum brightness provided by said first electron gun.

13. In a color television receiver, comprising:
 a. an in-line color CRT having first, second and third electron guns, each having a cathode element and an accelerating electrode;
 b. first, second and third transistor amplifiers for first, second and third color channels, respectively, each of said first, second and third transistor amplifiers having a base, emitter and collector;
 c. first and second potential sources associated with each of said first, second and third transistor amplifiers;

d. first variable impedance means for coupling said second source to said collectors of said first, second and third transistor amplifiers, said second variable impedance means being varied to control both the gain and the collector DC voltage of said first, second and third transistor amplifiers in proportion to the adjustment of said second variable impedance means; and e. second impedance means for coupling said first potential source to said collectors of said first, second and third transistor amplifiers.

14. The color television receiver as claimed in claim 13, wherein said first variable impedance means comprises a first variable resistive element coupled between said collectors of said first and second transistor amplifiers for differentially applying said first potential source thereto, and a second variable resistive element for variably coupling its second source to said collector of said third transistor amplifier.

15. A color television receiver as claimed in claim 13, wherein said accelerating electrodes of said first, second and third electron guns of said in-line color television receiver are commonly connected and there is further provided a variable voltage means coupled to said commonly-connected accelerating elements.

16. A color television receiver as claimed in claim 14, wherein there is further included switch means disposable from a first position in which said first variable resistive element is coupled thereby to said collector of said second transistor amplifier and said second variable resistive element is coupled thereby to said collector of said third transistor amplifier, to a second position wherein said first variable resistive element is coupled thereby to said collector of said third transistor amplifier and said second variable resistive element is coupled thereby to said collector of said second transistor amplifier.

17. A method of balancing the colors displayed by a color CRT of a color television receiver; wherein the color television receiver comprises a color CRT having first, second and third electron guns, each having a cathode element and an accelerating electrode; first, second and third transistor amplifiers for respectively driving said first, second and third electron guns; first and second potential sources associated with each of said first, second and third transistor amplifiers; impedance means for coupling the second potential source to the collectors of the first, second and third transistor amplifiers; a first variable resistive element having end terminals coupled to the collectors of the first and second transistor amplifiers and having an adjustable tap coupled to the first potential source; a second variable resistive element for variably coupling the first potential source to the collector of the third transistor amplifier; and a variable voltage means for applying a variable potential to the commonly-connected accelerating electrodes of the first, second and third electron guns, said method comprising the steps of:

a. adjusting the variable voltage means to apply a minimum voltage to the commonly-connected accelerating electrodes;

b. adjusting the first variable resistive element to obtain a color display according to a substantially equal mixture of the colors corresponding to the first and second electron guns;

c. adjusting the second variable resistive element so that a substantially white image appears upon the color CRT; and d. adjusting the variable voltage means until the electron beams of the first, second and third electron guns are cut off.

* * * * *

UNITED STATES PATENT AND TRADEMARK OFFICE
CERTIFICATE OF CORRECTION

PATENT NO. : 4,112,460
DATED : September 5, 1978
INVENTOR(S) : Blayne E. Arneson It is certified that error appears in the above-identified patent and that said Letters Patent are hereby corrected as shown below:

Column 1, after "1. Field of the Invention", delete --This invention relates to color television--.

Signed and Sealed this

Tenth Day of April 1979

[SEAL]

Attest:

RUTH C. MASON
Attesting Officer

DONALD W. BANNER
Commissioner of Patents and Trademarks